Figure 1:
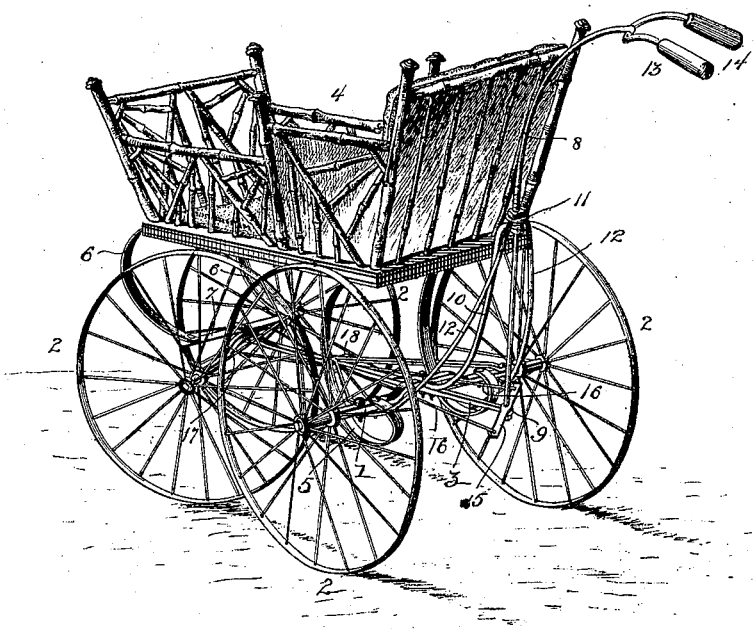

(No Model.)

G. L. ROTHARMEL.
GUIDING ATTACHMENT FOR BABY CARRIAGES.

No. 576,617. Patented Feb. 9, 1897.

Witnesses
E. H. Monroe
R. M. Smith

By his Attorneys,
C. A. Snow & Co.

Inventor
Geo. L. Rotharmel

THE NORRIS PETERS CO., PHOTO-LITHO., WASHINGTON, D. C.

UNITED STATES PATENT OFFICE.

GEORGE LAUTEN ROTHARMEL, OF NORTHUMBERLAND, PENNSYLVANIA.

GUIDING ATTACHMENT FOR BABY-CARRIAGES.

SPECIFICATION forming part of Letters Patent No. 576,617, dated February 9, 1897.

Application filed September 3, 1896. Serial No. 604,783. (No model.)

*To all whom it may concern:*

Be it known that I, GEORGE LAUTEN ROTHARMEL, a citizen of the United States, residing at Northumberland, in the county of Northumberland and State of Pennsylvania, have invented a new and useful Guiding Attachment for Baby-Carriages, of which the following is a specification.

This invention relates to guiding attachments for baby-carriages and similar small vehicles, push-carts, &c.; and the object in view is to provide means whereby the operator, standing or walking behind the vehicle, may readily turn the front axle for guiding the vehicle without having to tilt the same upon the rear wheels and using the latter as a fulcrum upon which to swing said vehicle.

The improved attachment may be readily applied to any baby-carriage or similar vehicle already in use by a slight change in the running-gear.

The invention consists in certain novel features and details of construction and arrangement of parts, as hereinafter fully described, illustrated in the drawings, and pointed out in the claims hereto appended.

Figure 2:
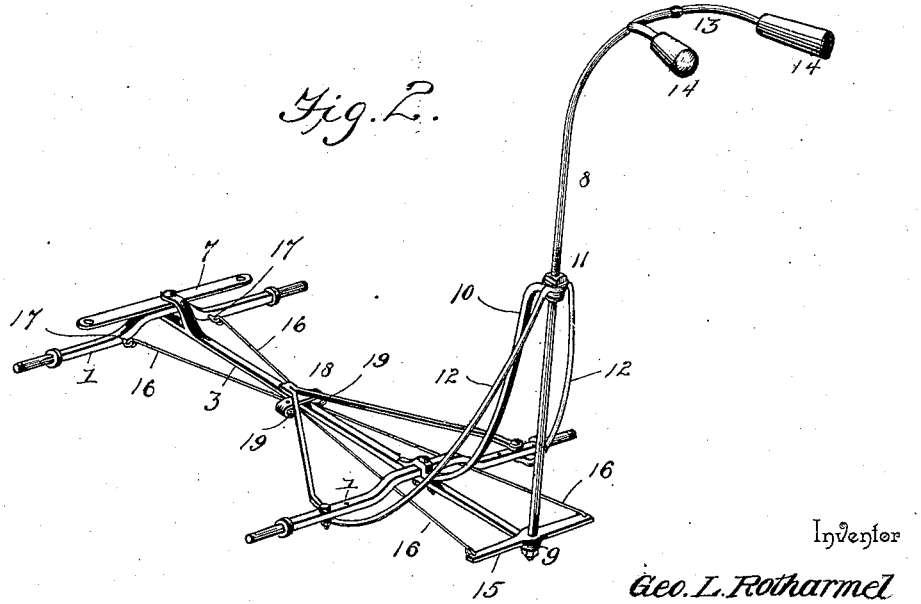

In the accompanying drawings, Figure 1 is a perspective view of a baby-carriage, showing the improved guiding attachment applied thereto. Fig. 2 is a detail perspective view of a sufficient portion of the running-gear to illustrate the operation and manner of applying the guiding device.

Similar numerals of reference designate corresponding parts in both figures of the drawings.

Referring to the drawings, 1 designates the front and rear axles, and 2 the carrying-wheels, the forward pair of carrying-wheels being preferably of less diameter than the rear pair for facilitating the turning of the vehicle.

3 designates the reach-bar which connects the front and rear axles and to which the front axle is pivotally connected at its center.

The body of the vehicle (indicated at 4) is supported directly on the rear axle upon the rests 5 and is supported at its forward end on rests 6 at the opposite ends of the bolster 7, whereby the front axle may turn freely. The reach-bar 3 is extended back of the rear axle a sufficient distance to form a support for a steering-rod 8, having its lower end journaled in an eye-bearing 9 in the rear end of the reach.

10 designates a curved brace which is rigidly attached by bolting or otherwise to the rear axle or to the reach-bar, or to both at their point of junction, said brace extending upward and rearward and being provided at its upper end with an eye-bearing 11, through which the steering-rod 8 passes.

Diagonal or oblique braces 12 extend from the upper end of the base 10 to the rear axle at points equidistant from the center thereof and near the rear wheels, said braces preventing lateral movement of the steering-rod.

The steering-rod 8 is provided at its upper end with a rigid handle-bar 13, provided at each end with hand-grips 14, and is provided at its lower end with a cross-piece 15, from the opposite ends of which wires or other connections 16 extend forward to the front axle, where they connect pivotally to said axle by means of suitable eyes 17.

Near the center of the reach-bar 3 or at a suitable point intermediate the axles is arranged a horizontal bracket 18, over which the wires 16 pass, and at each end of said bracket is a roller 19, against which one of the wires 16 presses. By means of the rollers 19 the wires or connections 17 are held close to the reach-bar 3, so as to be out of the way of the front wheels when the front axle is swung for turning the vehicle.

By means of the construction above described it will be seen that a person walking behind the vehicle with the hands upon the grips 14 may readily turn the front axle and cause the vehicle to travel in a circular path, thus avoiding the necessity of tilting the vehicle upon the rear wheels for causing the latter to act as a fulcrum as the front of the vehicle is swung to one side or the other. It is much less arduous to manage the vehicle with this attachment, and said attachment also materially increases the life of the carriage, as it removes the lateral drag and strain on the wheels resulting from the usual method of changing the course of the vehicle.

It will be apparent that changes in the form, proportion, and minor details of construction may be resorted to without departing from the spirit or sacrificing any of the advantages of this invention.

Having thus described the invention, what is claimed as new is—

1. In a vehicle of the class described, the reach-bar extended in rear of the rear axle and provided with an eye-bearing, in combination with a rearwardly and upwardly curving brace connected to the reach-bar and provided with an eye-bearing above the bearing in said reach-bar, oblique braces extending from the aforesaid brace to the rear axle, a guiding-rod journaled in said eye-bearings and having a handle-bar with grips at its upper end, a cross-piece rigidly attached to the lower end of said guiding-rod, connections extending from the ends of said cross-piece to the front axle and rollers supported by the reach-bar, intermediate the axles, over which the connections work, all combined and arranged substantially as described.

2. In a vehicle of the class described, the reach-bar extended back of the rear axle and provided at its rear end with an eye-bearing, in combination with a steering-rod journaled therein and provided at its upper end with a handle-bar and grips, a cross-piece rigidly secured to the lower end of said guiding-rod, connections between the opposite ends of said cross-piece and the front axle, and a bracket on the reach-bar intermediate the axles, said bracket having spaced rollers between which said connections run, whereby said connections are held inward in proximity to the reach-bar, substantially as and for the purpose described.

In testimony that I claim the foregoing as my own I have hereto affixed my signature in the presence of two witnesses.

GEORGE LAUTEN ROTHARMEL.

Witnesses:
JOHN W. McLAINE,
WILLIAM DIEHL.